United States Patent
Kusuhata (10) Patent No.: US 10,341,521 B2
(45) Date of Patent: Jul. 2, 2019

(54) IMAGE READING DEVICE

(71) Applicant: RISO KAGAKU CORPORATION, Tokyo (JP)

(72) Inventor: Masahiko Kusuhata, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 2 days.

(21) Appl. No.: 15/747,506

(22) PCT Filed: Jul. 8, 2016

(86) PCT No.: PCT/JP2016/070241
§ 371 (c)(1),
(2) Date: Jan. 25, 2018

(87) PCT Pub. No.: WO2017/022408
PCT Pub. Date: Feb. 9, 2017

(65) Prior Publication Data
US 2018/0220027 A1    Aug. 2, 2018

(30) Foreign Application Priority Data
Jul. 31, 2015    (JP) ................................ 2015-151647

(51) Int. Cl.
*H04N 1/04* (2006.01)
*H04N 1/047* (2006.01)
(Continued)

(52) U.S. Cl.
CPC ............. *H04N 1/047* (2013.01); *G03B 27/62* (2013.01); *G06T 1/00* (2013.01); *H04N 1/04* (2013.01); *H04N 1/10* (2013.01)

(58) Field of Classification Search
CPC ...... H04N 1/00835; H04N 1/047; H04N 1/04; H04N 1/10; G03B 27/62; G06T 1/00; G03G 27/62
(Continued)

(56) References Cited

U.S. PATENT DOCUMENTS 5,932,861 A * 8/1999 Iwaguchi et al. .............. 235/455
2004/0233478 A1* 11/2004 Ishido et al. ................... 358/449
(Continued)

FOREIGN PATENT DOCUMENTS

| JP | 2003-296721 | 10/2003 |
|---|---|---|
| JP | 2006-287901 | 10/2006 |

(Continued)

OTHER PUBLICATIONS

Official Communication issued in International Bureau of WIPO Patent Application No. PCT/JP2016/070241, dated Oct. 4, 2016, along with English-language translation.

*Primary Examiner* — Cheukfan Lee
(74) *Attorney, Agent, or Firm* — Greenblum & Bernstein, P.L.C.

(57) ABSTRACT

An image reading device includes: a platen on which a document is placed; a platen cover openable and closable with respect to the platen; a cover-open sensor which detects a fact that the open/close angle of the platen cover has passed a predetermined angle from a close state; a CCD line sensor including charge coupled devices (CCD) arranged for recording a variation in distribution for a fixed period of time of incident light when detecting passing of the platen cover; a variation amount calculator which calculates a variation amount of incident light at each distribution point on the basis of a variation in distribution recorded by the CCD line sensor; and a variation amount determination unit which determines whether or not a variation amount calculated by (Continued)

the variation amount calculator exceeds a predetermined threshold.

4 Claims, 10 Drawing Sheets

(51) Int. Cl.
  *G03B 27/62* (2006.01)
  *G06T 1/00* (2006.01)
  *H04N 1/10* (2006.01)
(58) Field of Classification Search
  USPC ............... 358/488, 486, 497, 466, 475, 509
  See application file for complete search history.

(56) References Cited

U.S. PATENT DOCUMENTS

| | | | |
|---|---|---|---|
| 2009/0122357 A1* | 5/2009 | Ishido et al. .................. | 358/449 |
| 2009/0237751 A1* | 9/2009 | Ishido ........................... | 358/483 |
| 2010/0067065 A1* | 3/2010 | Ishido ........................... | 358/449 |
| 2013/0044334 A1* | 2/2013 | Igawa .................. | G03G 15/607 |
| | | | 356/635 |
| 2016/0134769 A1* | 5/2016 | Yamamoto ......... | H04N 1/00554 |
| 2017/0034386 A1* | 2/2017 | Kusuhata ........... | H04N 1/00684 |
| 2018/0131828 A1* | 5/2018 | Suzuki ............... | H04N 1/00753 |

FOREIGN PATENT DOCUMENTS

| | | |
|---|---|---|
| JP | 2007-28185 | 2/2007 |
| JP | 2012-99951 | 5/2012 |
| JP | 2012-119868 | 6/2012 |

* cited by examiner

IMAGE READING DEVICE

TECHNICAL FIELD

The present invention relates to an image reading device which is included in a scanner, a photocopier, a FAX machine, a multi-function printer, and the like, and which optically reads a document placed on a platen.

BACKGROUND ART

There is an image reading device which is included in a scanner, a photocopier, a FAX machine, a multi-function printer, and the like, and which optically reads a document placed on a platen. If this image reading device erroneously determines a document size, it cannot correctly read an image and causes the loss or the like of image data. Therefore, a document size detection mechanism for detecting the size of a document to be read is mounted on the image reading device.

As the mechanism for detecting the document size, there is an approach of detecting the document size with an image sensor using a charge coupled device (hereinafter, CCD). According to this approach using a CCD, the number of reflection sensors expensive as compared with a CCD can be reduced to provide an inexpensive configuration, and the document width can be detected by utilizing the characteristic that the brightness of a document portion increases and the brightness of a non-document portion decreases by reading a document utilizing the light source of a scanner when a pressure plate is open.

However, in this approach using a CCD, the ambient light may cause erroneous detection and cause erroneous size detection, resulting in occurrence of waste sheet during copying. As such an approach with an ambient-light countermeasure, there is the technique disclosed in Patent Literature 1. The technique disclosed in this Patent Literature 1 is an approach of cancelling out the influence of the ambient light by calculating a difference between reading when a light source is ON and reading when the light source is OFF.

However, a light amount variation of the ambient light is not assumed in this approach, and therefore when there is the ambient light whose brightness varies, such as in a fluorescent lamp and/or in LED visible light communications, the difference between ON/OFF of a light source may fail to cancel out the influence of the ambient light. In contrast, there is a method for reducing the influence of the variation in brightness by increasing the read time and performing calculation, such as time averaging, by taking into consideration the influence of the ambient light whose brightness varies.

CITATION LIST

Patent Literature

Patent Literature 1: Japanese Patent Laid-Open Publication No. 2012-119868

SUMMARY OF INVENTION

Technical Problem

According to the method in which the read time is increased and the time averaging of brightness is used as described above, the read time can be sufficiently secured in reading in a state where the pressure plate is open, and therefore a countermeasure can be taken by increasing the read time and then time-averaging and the like. At this time, there is a problem that in the open state the detection of the timing when a document has been set is difficult and a clear trigger to start reading cannot be obtained. Therefore, the detection operation is usually performed at the timing when a document has been set, with an operation to close the pressure plate used as a trigger.

However, when the detection operation is performed in the course of closing the pressure plate, there is a problem that a sufficient read time cannot be secured because the read operation has to be finished within a limited time. Moreover, in the detection using, as a trigger, a sensor which detects a fact that the pressure plate angle has reached a predetermined angle A, if the pressure plate angle further decreases as the result of the pressure plate which has been closed when a certain time has elapsed after detecting the trigger, and the pressure plate angle becomes smaller than a predetermined angle B (here, the predetermined angle B is smaller than the predetermined angle A), then the rear surface of the pressure plate glares when irradiated with a light source in reading. Therefore, there is a risk of resulting in erroneous detection. Then, when the reading with the light source being turned off is performed in order to avoid glaring of the rear surface of the pressure plate, the pressure plate serves as eaves and the ambient light does not enter if the angle becomes small, so there is a risk that the ambient light cannot be correctly obtained.

Then, the present invention solves the problems as described above, and has an object to provide an image reading device capable of reducing erroneous detection even in an environment where the light amount of the ambient light varies in detecting the size of a document.

Solution to Problem

In order to achieve the above-described object, a first feature of an image reading device according to the present invention is an image reading device which optically reads a document, the device including: a platen on which a document is placed; a pressure plate openable and closable with respect to the platen; an angle detector which detects a fact that an open/close angle of the pressure plate has passed a predetermined angle from a close state; a reader which records a variation in distribution for a fixed period of time of incident light heading toward an inside of the platen every time the angle detector detects passing of the pressure plate; a variation amount calculator which calculates a variation amount of incident light at each distribution point on the basis of a variation in distribution recorded by the reader; and a variation amount determination unit which determines whether or not a variation amount calculated by the variation amount calculator exceeds a predetermined threshold.

A second feature of the image reading device according to the present invention is that the device further includes: a lighting window which is spaced from the platen and which incident light can enter; and a moving unit, or mover, configured to move the reader between a lower position of the platen and a lower position of the lighting window, wherein the reader records a variation in distribution of incident light through 15 the lighting window.

A third feature of the image reading device according to the present invention is that the device further includes a threshold change unit configured to change the threshold in accordance with a detection result of the angle region detector when reading is started.

BRIEF DESCRIPTION OF DRAWINGS

FIG. 1(a) is a front view illustrating a schematic configuration of an image forming apparatus including an image reading device according to an embodiment, while FIG. 1(b) is a side view of an image reading device portion in the image forming apparatus of FIG. 1(a).

FIG. 3(a) is an explanatory view illustrating a schematic configuration of a platen cover, while FIG. 3(b) is an explanatory view illustrating relationships between detection angle regions and angle sensors.

FIG. 4(a) is a block diagram illustrating characteristic functional units of the image reading device according to the embodiment, while FIG. 4(b) is a block diagram illustrating functional units of a read controller.

FIG. 7(a) is a top view illustrating positions of a carriage in the configuration of the platen according to the embodiment, while FIG. 7(b) is a side view thereof.

DESCRIPTION OF EMBODIMENTS

Hereinafter, an embodiment of the present invention will be explained with reference to the drawings. Throughout the respective drawings, the same or equivalent reference numeral is attached to the same or equivalent part or component. However, note that the drawings are schematic only and differ from the real ones. Moreover, the drawings also include the portions having different mutual sizes and/or ratios. Moreover, the embodiment shown below exemplifies a device or the like for embodying the technical idea of the present invention, but the technical idea of the present invention shall not be construed as limiting the arrangement and the like of the respective components to the ones described below. The technical ideas of the present invention can be modified within the scope of the claims.

(Configuration of Image Reading Device)

Figure 1:
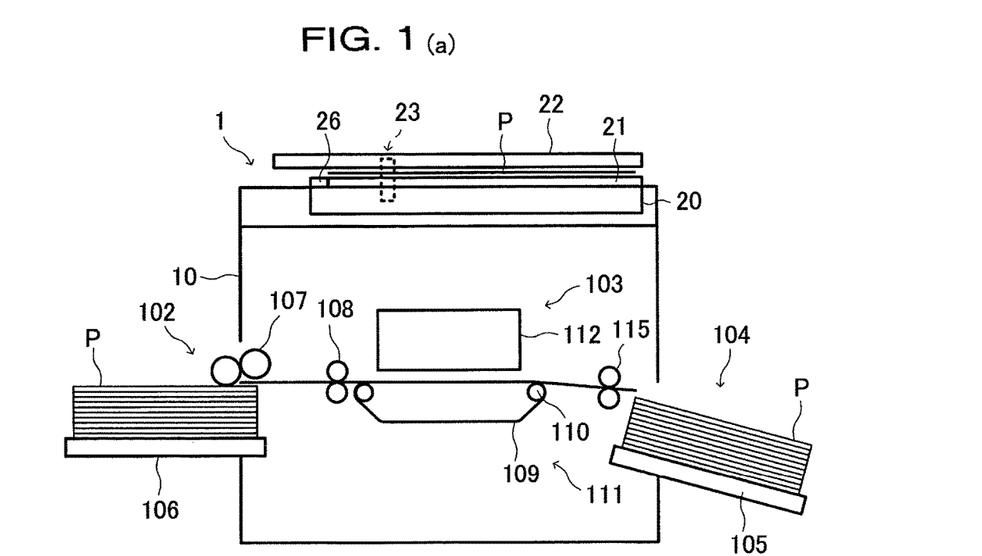
Figure 2:
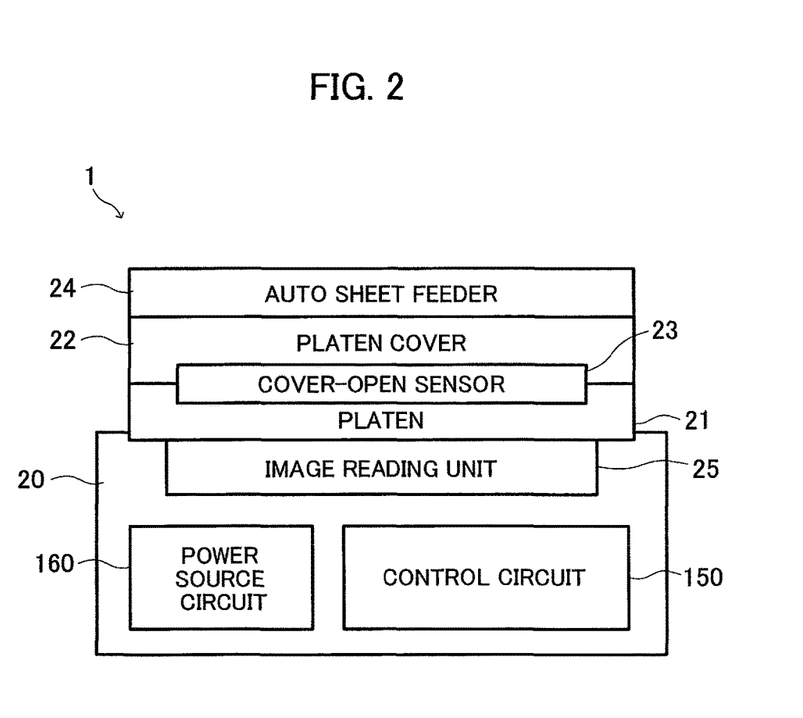
FIG. 2 is a block diagram illustrating the image reading device portion according to the embodiment.

FIG. 1 is an explanatory view schematically illustrating a general configuration of an image forming apparatus including an image reading device 1 according to the present invention, and FIG. 2 is a block diagram schematically illustrating a general configuration of an image reading device portion. The image reading device 1 in this embodiment employs a flat-bed scheme for fixing and reading a document to be read. As illustrated in FIGS. 1 and 2, the image reading device 1 has, as an apparatus main body, a scanner 20 configured to optically read a document, and is provided in an upper portion of an apparatus main body 10 of the image forming apparatus which forms an image on a recording medium such as a sheet, the image being based on image data output from the scanner 20.

The apparatus main body 10 includes a feeder 102, an image forming unit 103, a discharger 104, and a control circuit 150. The feeder 102 includes: a feeding tray 106 capable of stacking many sheets; and a feeding roller 107 which picks up the stacked sheets one by one and conveys the same at a predetermined feeding timing. The feeder 102 is a unit which, in printing, supplies the sheet picked up by the feeding rollers 107 to the image forming unit 103 at a predetermined feeding timing while restricting, along a conveying path, the conveying direction of this sheet.

The image forming unit 103 includes: a resist roller 108 configured to correct the skewing of a sheet supplied from the feeder 102 and feed, at a predetermined printing timing, the sheet whose skewing has been corrected; an image forming unit 112 configured to print a desired image on the sheet fed from the resist roller 108, the image forming unit 112 corresponding to a photosensitive drum or developing device in an electrophotographic method, corresponding to an inkjet head in an inkjet method, and corresponding to a printing drum in a stencil printing method; and a conveyer 111 configured to convey a sheet with the cooperation between an annular conveyer belt 109 which rotates and a conveyer belt roller 110 which turns the conveyer belt 109 in a predetermined direction. The image forming unit 103 is a unit configured to print a desired image with the image forming unit 112 while conveying, with the conveyer 111, the sheet supplied from the feeder 102.

The discharger 104 includes a discharge tray 105 into which a printed sheet is discharged and a plurality of pairs of discharge rollers 115 configured to convey a printed sheet to the discharge tray 105. The discharger 104 is a unit which discharges a sheet printed by the image forming unit 103 to the outside of the apparatus and stacks the same. Moreover, the control circuit 150 includes a CPU, a signal processor, a communication processor, and the like. Furthermore, a power source circuit 160 includes an electric power supply device configured to supply electric power to each unit.

As illustrated in FIG. 2, the scanner 20 includes a platen 21, a platen cover 22, an auto sheet feeder 24, a cover-open sensor 23, and the like. The platen 21 is a platen made of a transparent glass and the like, on which a document P to be read is placed. The platen cover 22 is provided above the platen 21. The platen cover 22 is openable and closable in an opening-closing direction (main scanning direction, document width direction) with respect to the platen 21 and is a pressure plate for pressing the document P placed on the platen 21. The color of a surface of the platen cover 22 which presses the document P is assumed to be white or a color near white. The auto sheet feeder 24 is an auto document feeder (hereinafter ADF) which is integrated with the platen cover 22 and automatically feeds a document to the platen 21.

The cover-open sensor 23 is an angle detector configured to detect an open/close state of the platen cover 22 and an angle thereof, and functions as a first angle detector configured to detect a fact that the open/close angle of the platen cover 22 has closed from the angle in an open state to a first angle and as a second angle detector configured to detect a fact that the platen cover 22 has been further closed from the first angle to a second angle. Specifically, the cover-open sensor 23 is provided in a vicinity of a portion where the main body of the scanner 20 and the platen cover 22 are connected to each other, and detects whether or not the platen cover 22 has reached a predetermined angle with respect to the platen 21.

In detail, the cover-open sensor 23 includes optical sensors 233, 234 and a sensor flag 235 installed inside the scanner 20 in a vicinity of a supporting shaft for opening and closing the platen cover 22. The optical sensors 233 and 234 are mechanisms for detecting multiple stages of open angles of the platen cover 22, and are capable of detecting an open angle of the platen cover 22 by the light of the optical sensors 233 and 234 blocked by the sensor flag 235 which moves up and down in synchronization with the opening/closing of the platen cover 22. Note that, although the optical sensors 233 and 234 are used as the sensors in this embodiment, the present invention is not limited thereto. Any sensor capable of detecting the position of the sensor flag 235 interlocking with the platen cover 22 may be used, and for example a photocoupler which is a similar photoelectric converter may be used. Alternatively, for example, a configuration may be possible, in which a magnet is provided at a position corresponding to the sensor flag 235 and a state of the sensor flag 235 is detected by detecting the magnet with a magnetic sensor.

Moreover, in the scanner 20, a white reference plate 26 used to obtain the data and the like for performing shading correction is arranged at a predetermined position on the home position side of the platen 21.

Figure 6:
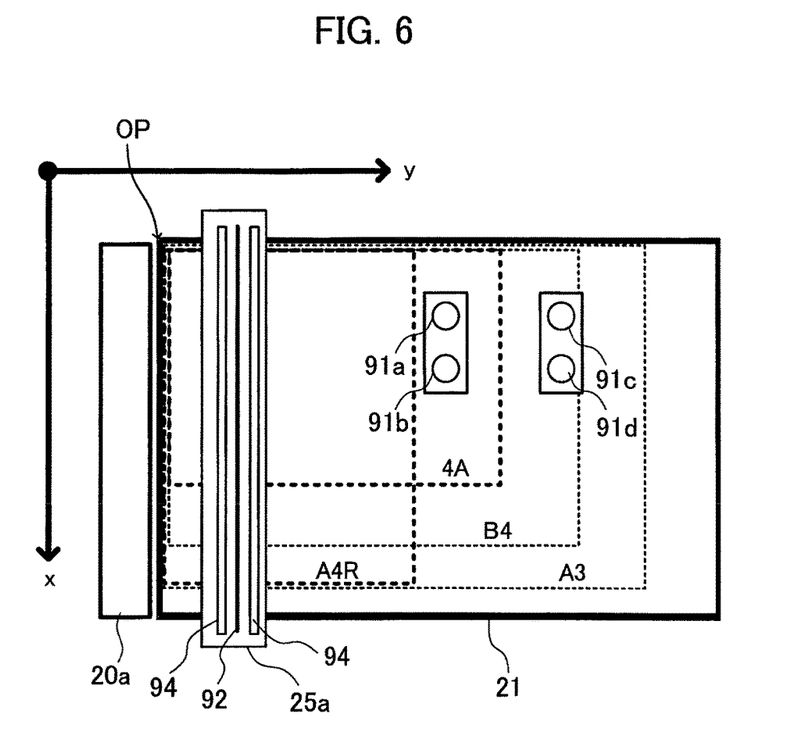
FIG. 6 is a top view illustrating a configuration of a platen according to the embodiment.

As illustrated in detail in FIG. 6, an image reading unit 25 includes a CCD line sensor 92 (reader) including image reading elements such as CCDs arranged on a line; an exposure lamp 94 which is a light source; a carriage 25a with the CCD line sensor 92 and exposure lamp 94; a motor for conveying the carriage 25a; and the like. The image reading unit 25 reads an image from the document by irradiating the document P placed on the platen 21 or a document, which is fed one by one by the auto sheet feeder 24 with the light of the exposure lamp 94, and receiving the reflection light thereof with an imaging element such as the CCD line sensor 92, and outputs image data corresponding to the read image to the control circuit 150 as job data.

Figure 3:
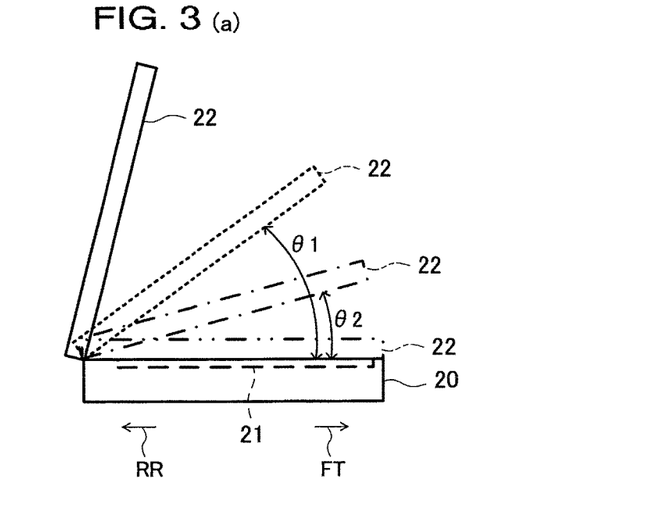

Next, a document-detection angle of the platen cover 22 and the detection of the angle of the platen cover 22 will be explained. FIG. 3(a) is a side view illustrating positions of the platen cover, while FIG. 3(b) is an explanatory view illustrating document size detection positions of the platen cover and the detection states of the sensors.

In the open state, the platen cover 22 is at an open position indicated by a solid line in FIG. 3(a). In the close state, the platen cover 22 is at a close position indicated by a two-dot chain line in FIG. 3(a). The platen cover 22 is openable/closable with respect to the platen 21 by being turned about one side on a rear side RR.

A first angle corresponds to a position of the platen cover 22 indicated by a broken line in FIG. 3(a), which is the position where an angle θ between the platen cover 22 and the platen 21 becomes an angle θ1. The first angle θ1 is smaller than an angle between the platen cover 22 located at the open position and the platen 21. When the platen cover 22 reaches a position at which the angle θ becomes the first angle θ1 in the course of being closed, the cover-open sensor 23 determines that the open/close state of the platen cover 22 has changed.

A second angle corresponds to a position of the platen cover 22 indicated by a one-dot chain line in FIG. 3(a), which is a position where the angle θ between platen cover 22 and the platen 21 becomes an angle θ2. The second angle θ2 is smaller than the first angle θ1. Further, in this embodiment, the position of the platen cover 22 is categorized into three regions.

Specifically, as illustrated in FIG. 3(b), the region where the platen cover 22 is located is divided into three regions as follows: a small angle region where the angle between the platen cover 22 and the platen 21 is less than the second angle θ2; a large angle region where the angle between the platen cover 22 and the platen 21 is greater than the first angle θ1; and a middle angle region where the angle between the platen cover 22 and the platen 21 is equal to or greater than the second angle θ2 and equal to or less than the first angle θ1, the middle angle region being located between the small angle region and the large angle region.

Which one of these regions the platen cover 22 is located in is determined from the detection result of the cover-open sensor 23. Specifically, it is adapted such that, when the platen cover 22 reaches the first angle at which the cover-open sensor 23 moves from the large angle region to the middle angle region, a middle-angle sensor (optical sensor 233) becomes an ON state from an OFF state, while when the platen cover 22 reaches the second angle at which the cover-open sensor 23 moves from the middle angle region to the small angle region, a small-angle sensor (optical sensor 234) becomes the ON state from the OFF state.

(Configuration of Read Controller)

FIG. 4(a) is a block diagram illustrating characteristic functional units of the image reading device 1, while FIG. 4(b) is a block diagram illustrating functional units of a read controller. Functional units not important for the explanation of this embodiment are omitted for simplicity.

As illustrated in FIG. 4(a), the control circuit 150 includes a CPU 50 (central processing unit), a RAM 30 (random access memory), a flash memory 40, an input/output interface 80, an FeRAM 60 (ferroelectric random access memory), a USB interface 70 (universal serial bus interface), and a system bus 150a connecting these units to each another.

Programs and the circuit information used for configuration are recorded in a non-volatile manner in the flash memory 40. The RAM 30 is a work area of the CPU 20. The CPU 20 virtually builds functional modules according to the programs recorded in the flash memory 40.

The image reading unit 25 includes a document size detection sensor 91 for detecting the size of the document P placed on the platen 21. As illustrated in FIG. 6, the document size detection sensor 91 includes document length detection size sensors 91a to 91d for detecting the length of the document in a sub-scanning direction (y-axis). The document length detection size sensors 91a to 91d are reflection sensors including a light emitting element and light receiving element, and are arranged respectively at positions corresponding to standard sizes.

Moreover, the image reading unit 25 includes the CCD line sensor 92 which optically reads an image, a motor 93 for driving lens and mirrors of an optical system, and the exposure lamp 94 which emits light toward a document.

The CCD line sensor 92 includes light receiving elements linearly arranged along a main scanning direction (x-axis in FIG. 6). The CCD line sensor 92 has, in addition to a function to read an image by reading the reflection light from a document with each light receiving element, a function to determine the document width by detecting the reflection light from the document P and/or the ambient light incident toward the platen 21 with each light receiving element and detecting a brightness distribution on a line, with a position where the document abuts on the rear side RR being set as an original point OP.

In this embodiment, a standard size of a document is detected from a combination of the document width in the main scanning direction detected by the CCD line sensor 92 and the document length in the sub-scanning direction detected by the sensors 91*a* to 91*d*.

Figure 4:
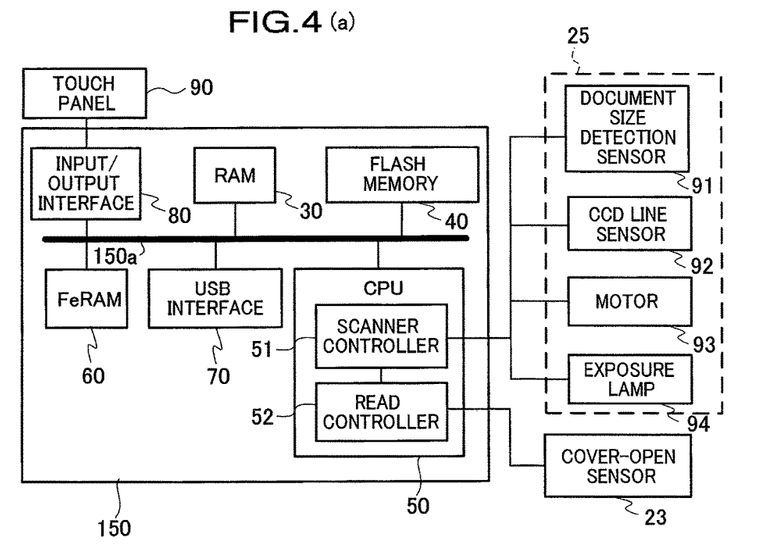

On the other hand, various programs and data are recorded in the flash memory 40 illustrated in FIG. 4(*a*). The programs include the circuit information for building logic circuits required for an image reading process as well as circuit information about a read controller 52. Various adjustment values and the like specific to the body structure of the image reading device 1 are recorded in a non-volatile manner in the FeRAM 60. A USB cable for connecting the image reading device 1 and a printer which is a host apparatus is connected to the USB interface 70.

The CPU 50 is an integrated circuit capable of virtually configuring the functional modules such as a logic circuit by loading a program. In this embodiment, a scanner controller 51 and the read controller 52 are built by loading a program. Note that, in this embodiment, a "module" refers to a functional unit configured from hardware such as an apparatus and/or device, software having the function thereof, a combination thereof, or the like, the functional unit being for achieving a predetermined operation.

The scanner controller 51 is a module which executes control and the like related to the carriage 25*a*, and controls the operations of the devices, such as the CCD line sensor 92, motor 93, and exposure lamp 94 included in the image reading unit 25. On the other hand, the read controller 52 is a module which determines the document size in reading an image and which executes the arithmetic processing required to read an image. In this embodiment, the read controller 52 has a function to detect a variation in brightness of the ambient light.

Figure 7:
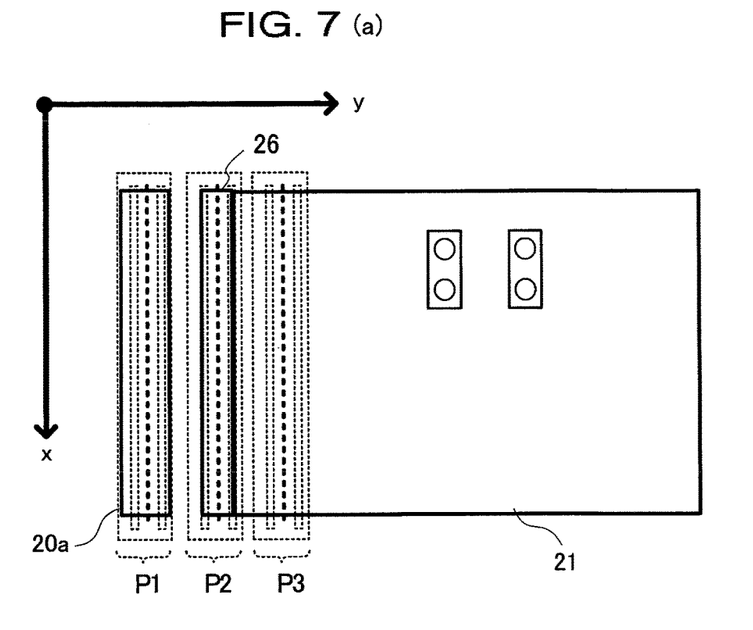

The carriage 25*a* is a moving unit, or mover, configured to mount and move the CCD line sensor 92 and/or exposure lamp 94, and is adapted to horizontally move in the sub-scanning direction by the motor 93. In detail, as illustrated in FIGS. 7(*a*) and 7(*b*), the carriage 25*a* is adapted to move to a carriage position depending on a state of the image reading device 1 and a stage of the read operation thereof.

In a standby state, the carriage 25*a* retreats to a home position P1 spaced in the sub-scanning direction from a glass surface of the platen 21. This home position P1 is located at the back (toward left direction of the y-axis in FIG. 7(*a*)) of the original point OP which is the abutting position. The home position P1 is a position corresponding to an AF window 20*a* (lighting window) provided at a place where a document passes during an automatic feeding operation, which also serves as an ambient light pre-detection position.

Further, during shading correction, the carriage 25*a* is moved to a shading read position P2. The shading read position P2 is a position corresponding to the white reference plate 26 adjacent on the platen 21 side of the home position P1, and is used to obtain data and the like for performing the shading correction by reading the white reference plate 26.

Furthermore, during detection of the document size, the carriage 25*a* is moved to a document size detection position P3. The document size detection position P3 is a position which is moved from the original point Op by approximately 2 cm in the sub-scanning direction under the glass surface of the platen 21.

(Configuration of Read Controller)

FIG. 4(*b*) is a block diagram illustrating an internal configuration of the read controller 52. As illustrated in FIG. 4(*b*), the read controller 52 includes an operation controller 52*b* and a carriage controller 52*e*.

The operation controller 52*b* is a module configured to integrally control the operation of each module inside the read controller 52, and receives the data from each sensor and distributes the same to each module inside the read controller 52. Specifically, the operation controller 52*b* receives sensor's detection results and/or read image data from the document size detection sensor 91 and/or CCD line sensor 92 through the scanner controller 51, and receives the open/close angle of the platen cover 22 and the like from the cover-open sensor 23.

This operation controller 52*b* includes an angle determination unit 52*i*. This angle determination unit 52*i*, or angle determiner, is a module configured to determine an angle region from the open/close angle of the platen cover 22 detected by the cover-open sensor 23, and detects, in detecting the document size, that the platen cover 22 has changed from the open state to the first angle and that the platen cover 22 has further changed from the first angle to the second angle.

The carriage controller 52*e* is a module configured to control the operation of the carriage 25*a*, and is a movement controller configured to move the CCD line sensor 92 between a lower position of the platen and a lower position of the AF window 20*a*.

Moreover, the read controller 52 includes a variation amount determination unit 52*c*, a variation amount calculator 52*d*, and a size setting unit 52*a*, as the modules to cope with a variation in brightness of the ambient light.

The variation amount calculator 52*d* is a module which calculates a variation amount of the incident light at each distribution point on the basis of a variation in distribution recorded by the reader.

Specifically, this variation amount calculator 52*d* analyzes a brightness distribution of reflection light contained in the image data which the CCD line sensor 92 read at each open/close angle, and associates and records each open/close angle and a brightness-distribution data of reflection light at the time point of locating at this angle in advance, and extracts a variation of the brightness-distribution data for a fixed period of time. This extracted brightness-distribution data is input to the variation amount determination unit 52*c*. Note that, for this fixed period of time, using, as a trigger, the fact that the platen cover 22 is opened to a boundary between the middle angle region and the large angle region and that the middle-angle sensor is turned off, the data in an elapsed time is analyzed in the unit of millisecond.

Figure 8:
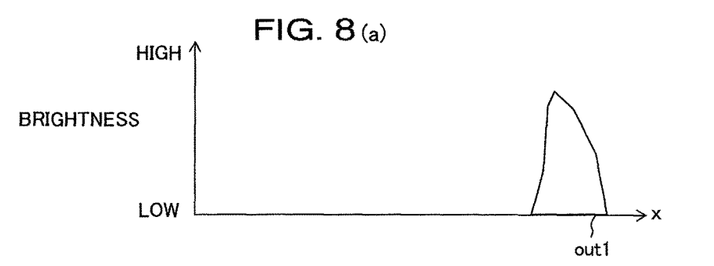
FIGS. 8(a) to 8(d) are explanatory views illustrating a procedure of a method for detecting a brightness variation amount according to the embodiment.

The variation amount determination unit 52*c* is a module which determines whether or not the variation amount in the brightness distribution calculated by the variation amount calculator 52*d* exceeds a predetermined threshold. In this embodiment, as illustrated in FIGS. 8(*a*), 8(*b*), 8(*c*), and 8(*d*), the variation amount determination unit 52*c* obtains a maximum value out1 (FIG. 8(*a*)) in a brightness distribution in the main scanning direction (x axis) on the line sensor for a fixed period of time, and a minimum value out2 (FIG. 8(*b*)) within the same period of time, calculates a difference therebetween as an ambient light temporal variation amount out3 (FIG. 8(*c*)), compares this ambient light temporal variation amount out3 with a threshold (FIG. 8(*d*)), and, if likely to exceed the threshold, determines that there is a variation amount.

Moreover, a threshold change unit 52*f* is connected to the variation amount determination unit 52*c*. This threshold change unit 52*f*, or threshold changer, is a module configured to change the threshold for determining the light amount and/or variation amount of the ambient light, and operates in cooperation with an ambient light removal processor 52g.

The threshold change unit 52f is a module which changes a predetermined threshold in accordance with the open/close operation of the platen cover 22 performed by a user and in accordance with a subsequent read start timing. The threshold change unit 52f sets, in reading with the pressure plate being opened, the threshold high so as to make a change in the ambient light difficult to be detected, while when reading is started after the pressure plate is closed, it sets the threshold low so as to make a change in the ambient light easy to be detected.

The ambient light removal processor 52g is a module configured to remove the ambient light in brightness-distribution data using a light source ON/OFF differential method. Specifically, the ambient light removal processor 52g turns on and turns off the exposure lamp 94 which emits light toward a document, and records a distribution of the reflection light or incident light read by the CCD line sensor 92 during turning-on of the exposure lamp 94 and during turning-off of the exposure lamp 94, and removes the component of the ambient light on the basis of a difference extracted from the recorded distribution of reflection light or incident light.

This ambient light removal processor 52g includes an ambient light recorder 52h. The ambient light recorder 52h is a module which performs turns on and turns off the exposure lamp 94 when the pressure plate is at a predetermined open/close angle, and which records a distribution of reflection light or incident light during turning-on of the exposure lamp 94 and during turning-off of the exposure lamp 94. Moreover, the ambient light removal processor 52g removes the component of the ambient light on the basis of the distribution of reflection light or incident light recorded by the ambient light recorder 52h, and records this result on the ambient light recorder 52h.

Here, detection by the light source ON/OFF differential method is explained. When reading is performed with the platen cover 22 fully opened and/or when the platen cover 22 is located in the large angle region or the middle angle region, the brightness due to the reflection light of the document portion increases and the brightness also increases in a portion where the ambient light enters, and therefore the influence of the ambient light needs to be removed.

In this embodiment, an approach can be used, in which an edge of a document is detected on the basis of a difference in a brightness distribution of the reflection light between when the light source is turned on and when the light source is turned off. That is, when the pressure plate is located at either one of the angles equal to or greater than the second angle, the exposure lamp 94 is turned on and turned off, and a brightness distribution of the reflection light during turning-off of the exposure lamp 94 is excluded (subtracted) from a brightness distribution of the reflection light during turning-on of the exposure lamp 94, and the resultant data is recorded as light source ON/OFF differential data.

Figure 9A:
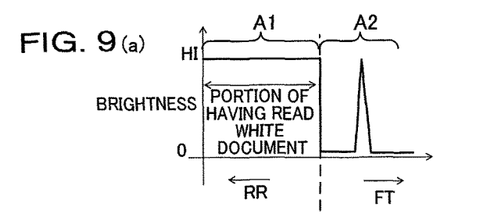
FIGS. 9(a) to 9(f) are explanatory views of detection using a light source ON/OFF differential method according to the embodiment.
Figure 9B:
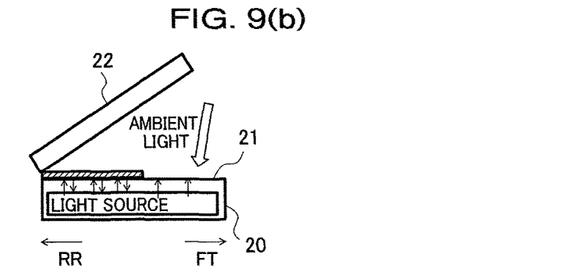
Figure 9C:
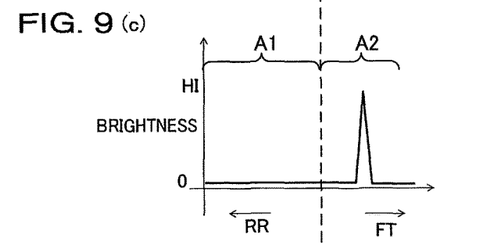
Figure 9D:
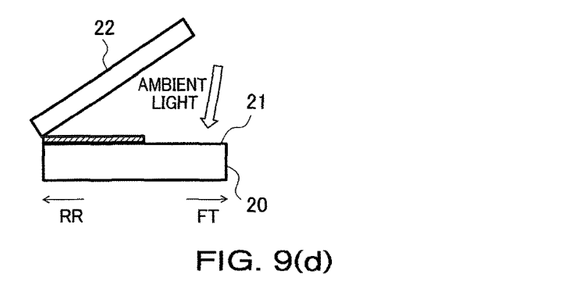
Figure 9E:
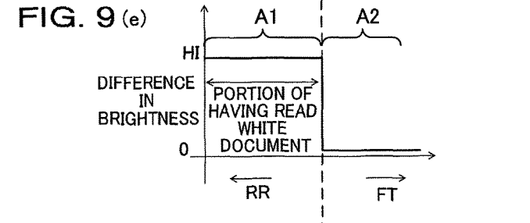

In reading during turning-on of the light source, as illustrated in FIGS. 9(a) and 9(b), the brightness due to the reflection light from a document increases in a region A1 on the rear side RR and the ambient light enters a region A2 on the front side FT which is a non-document portion. On the other hand, in reading during turning-off of the light source, as illustrated in FIGS. 9(c) and 9(d), the brightness increases by the amount of the ambient light in a region A2 on a front side FT. Accordingly, if the difference between these results is extracted, the brightness data read at a fixed position can be generated, in which the brightness in the document portion remains as it is while in the non-document region only the brightness of the ambient light is eliminated, as illustrated in FIG. 9(e).

Figure 9F:
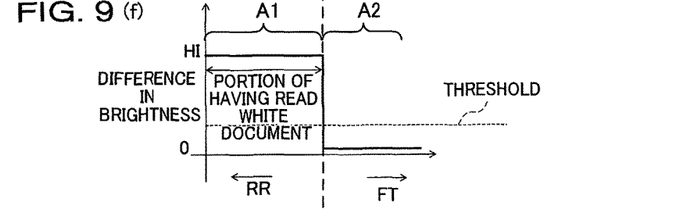

The brightness at each pixel on the line sensor extending in the main scanning direction is compared, starting from a front side FT, with a predetermined threshold on the basis of the brightness data read at a fixed position, and a position where the brightness firstly exceeds the threshold is detected as the edge of a document. In the example illustrated in FIG. 9(f), in the region A2 on the front side FT the brightness is generally low because the reflection light from a document is removed. Meanwhile, as coming to the region A1 where the document is placed, the brightness increases due to reflection light ref1 from the document and exceeds the threshold. Accordingly, it is determined that there is a document in the region A1, and the width of the document can be detected as the document width.

The size setting unit 52a is a module which sets the size of a document through a touch panel 90 on the basis of the result determined by the variation amount determination unit 52c, and includes a document size detector 52j. The document size detector 52j is a module which detects the width and length of a document from each data detected or analyzed by each module of the reading controller 52.

This document size detector 52j has the function as a document width detector. Here, either one of the methods below can be used: a detection method for setting a dark portion to the non-document portion on the basis of a brightness distribution on the CCD line sensor 92; and a document width detection method for comparing a brightness distribution in the middle angle region with a brightness distribution in the small angle region, and setting, on the basis of this comparison result, a portion having a larger change in brightness to the non-document portion.

Note that, in detecting the document width the document size detector 52j can detect the document width by using, instead of the distribution data in the middle angle region, a result of the calculation by the ambient light removal processor 52g recorded on the ambient light recorder 52h. Specifically, a portion having a larger change in brightness is set to the non-document portion on the basis of a difference between a result recorded by the ambient light recorder 52h and a result recorded in the small angle region.

(Operation Procedure During Reading of Image)

Figure 5:
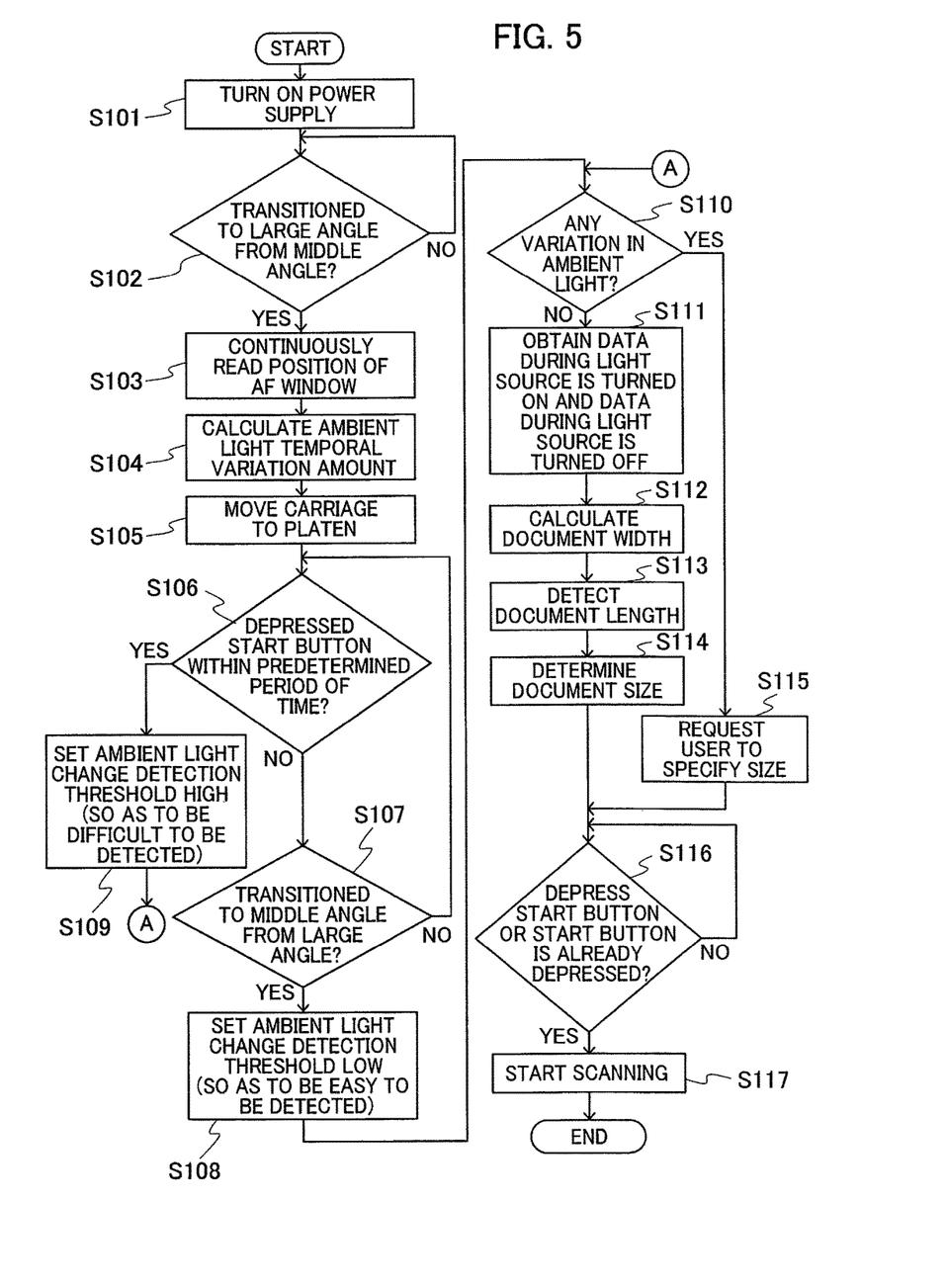
FIG. 5 is a flowchart showing an image reading operation according to the embodiment.
Figure 10:
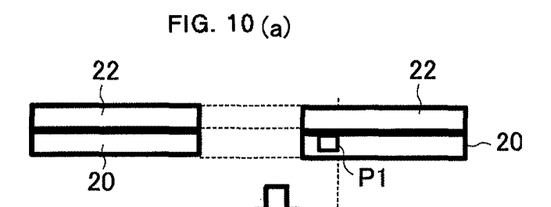
FIGS. 10(a) to 10(e) are explanatory views illustrating an ambient light detection timing associated with opening/closing of the pressure plate and a read timing used for size detection in the embodiment.

Next, the characteristic operation of the image reading device 1 in this embodiment will be explained. FIG. 5 is a flowchart showing the operations during reading of an image. FIG. 10 is an explanatory view illustrating an ambient light detection timing associated with the opening/closing of the pressure plate and a read timing used for size detection.

First, once the power supply of a main body device is turned on (S101), each unit of the main body device is activated and a warming-up procedure is executed, movable parts, such as the carriage, are reset to a predetermined position, and the carriage is moved to the home position P1 of the AF window. Note that, here, as illustrated in FIG. 10(a), the platen cover 22 is assumed to be closed. Then, after a predetermined warming-up procedure is complete, the apparatus is set to the standby state by loop processing until the platen cover 22 is set to the open state from the close state ("N" in S102).

Then, as illustrated in FIGS. 10(b) and 10(c), once the platen cover 22 is operated from the close state to the open state and is moved from the second angle θ2 to the first angle θ1 ("Y" in S102), in the open state of the platen cover 22, the incident light is continuously read for a predetermined period of time at the position of the AF window (S103), a temporal variation amount of the ambient light is calculated (S104), and this calculation result is recorded in advance. Subsequently, as illustrated in FIG. 10(d), the carriage is moved to the document size detection position P3 on the platen side, and the apparatus is put on standby in order to read a document (S105).

Next, it is determined whether a user is to start reading a document with the platen cover 22 being opened or a user is to start reading a document after closing the platen cover 22. Specifically, if the start button has been depressed without closing the platen cover 22 within a predetermined period of time ("Y" in S106), an ambient light change detection threshold is set high so as to increase the allowance for the variation in the ambient light and make the ambient light difficult to be detected (S109). After changing the ambient light change detection threshold in step S109, the flow transitions to step S110, where it is determined whether or not there is a variation in the ambient light.

On the other hand, when the platen cover 22 is closed without pressing the start button within a predetermined period of time as illustrated in FIG. 10(e) ("Y" in S107), the ambient light change detection threshold is set low so as to reduce the allowance for the variation in the ambient light and make the ambient light easy to be detected (S108). After changing the ambient light change detection threshold in step S108, the flow transitions to step S110, where it is determined whether or not there is a variation in the ambient light.

Subsequently, the data (data obtained by time-averaging the brightness values obtained by reading the incident light for a predetermined period of time with the light source being turned off in the large angle region) obtained through step S103 and step S104 is compared with the threshold (threshold set in step S108 or step S109) set in accordance with the open/close angle of the platen cover 22, so as to determine whether or not there is a variation in the ambient light (S110). The reason why the threshold is changed in accordance with the open/close angle of the platen cover 22 in step S110 is that the influence on the read data (read data obtained in step S111), which is used in calculating the document width in the subsequent step S112, from the ambient light can be more easily removed as the open/close angle becomes larger. This is because when the open/close angle is larger, the time required for acquisition of the read data can be set longer and secured than when the open/close angle is smaller. Accordingly, in step S110, by using a threshold which is changed so that the temporal variation in the ambient light in the middle angle region is more easily detected than in the large angle region, erroneous detection of the document size can be reduced while maintaining the advantage of the automatic size detection performed in the subsequent procedure.

If the variation in the ambient light is unlikely to exceed the threshold, then it is determined that there is no variation in the ambient light ("N" in S110) and the flow transitions to step S111. In step S111, the data of the reflection light when the light source is turned on and the data of the incident light when the light source is turned off are obtained, and the latter data is subtracted from the former data, so that the brightness distribution due to the ambient light can be removed. The time averaging of brightness is calculated both during turning-on of the light sources and during turning-off of the light source. Thanks to the time averaging, periodic ambient light and sporadic ambient light have less influence on the difference in brightness between during turning-on of the light sources and during turning-off of the light source. The averaging time is determined in accordance with angle regions, and the averaging time is set longer in the large angle region than in the middle angle region. By using this brightness distribution with the ambient light removed, the document width is calculated (S112), the document length is detected (S113), and the document size is determined on the basis of both detection results (S114), and input to the size setting unit 52a.

Note that, the following procedure may be adopted: in step S111, in obtaining each of the data of the reflection light when the light source is turned on and the data of the incident light when the light source is turned off, the read operation in each of the states during turning-on of the light sources and during turning-off of the light source is performed for a predetermined period of time, and in step 113, the average value in the brightness distribution in the time period required for obtaining the data in these read operations is calculated.

By using the average distribution of the brightness in the document width direction which is obtained for a predetermined period of time as described above, the influence on the read data obtained when the light source is turned on and the influence on the read data obtained when the light source is turned off, from the ambient light which is periodically varying and/or the ambient light which is sporadically generated can be alleviated. Accordingly, the ambient light which is constantly generated (the ambient light without a temporal variation) can be easily removed. Therefore, erroneous detection of the document size can be reduced.

Moreover, in order to make the influence from the ambient light easier to be alleviated, in step S111 the time required for acquisition of data may be changed in accordance with the angle between the platen cover 22 and the platen 21, such as a longer time is spent on the acquisition of data in the large angle region than on the acquisition of data in the middle angle region. For example, the time period of 100 ms may be spent on the acquisition in the large angle region while the time period of 10 ms may be spent on the acquisition in the middle angle region.

On the other hand, in S110, if the variation in the ambient light is likely to exceed the threshold, it is determined that there is a variation in the ambient light ("Y" in S110) and the flow transitions to step S116. In step S116, through a user interface, such as the touch panel 90, a user is requested to specify the size, the selection information of the size based on the user operation is input to the size setting unit 52a, and the size selection based on this user operation is preferentially applied without performing automatic size detection.

Next, in response to depression of the start button in the loop processing, or when the start button is already depressed in step S106 ("Y" in S116), scan is promptly started (S117).

(Operations/Effects)

According to this embodiment, when it is detected that the open/close angle of the platen cover 22 has passed a predetermined angle from the close state, a variation in distribution for a fixed period of time of the incident light heading toward the platen 21 is recorded and the variation amount of the incident light is calculated, and it is determined whether or not the calculated variation amount exceeds a predetermined threshold. In the case of the stationary ambient light whose brightness does not vary, by subtracting, in advance, this stationary ambient light from the reflection light as the result of the irradiation performed at the time of detecting the size, the influence of the ambient light can be removed. On the other hand, when a light source whose brightness varies, such as in a fluorescent lamp and in the LED visible light communications, is present around this image reading device, the brightness of the ambient light to be detected is not constant. Therefore, depending on the timing during size detection, even if this stationary ambient light is subtracted from the reflection light at the time of size detection, the influence of the ambient light cannot be correctly removed, thus causing erroneous detection.

In this embodiment, by calculating the variation amount for a fixed period of time of the incident light, the change in brightness of the ambient light which leads to erroneous detection of the document size can be detected. When the ambient light is varying, by switching the approaches of setting the document size the erroneous detection of the document size can be reduced while maintaining the advantage of the automatic size detection.

Moreover, in this embodiment, a change in brightness of the ambient light which leads to erroneous detection of the document size is detected by calculating the variation amount for a fixed period of time of the incident light and comparing the same with a threshold. When the ambient light is varying, the size of a document is set on the basis of a user operation. Thus, when the variation in brightness of the ambient light is large, by causing a user to select a document size without using the size selection of an automatic size detection function, the occurrence of waste sheet when the variation in brightness of the ambient light is large and the possibility of erroneous detection is high can be avoided.

Furthermore, in this embodiment, the AF window 20a used for an auto-feeder is provided separately from the platen 21 on which a document is placed during reading, so as to be able to record a variation in distribution of the incident light through this AF window 20a. Thus, according to this embodiment, by performing the ambient light detection under the AF window 20a, the ambient light can be detected without being affected by replacement of documents, and whether or not the ambient light is varying can be detected.

Furthermore, a lamp is turned on and off in detecting the ambient light, and on the basis of a difference extracted from a distribution of reflection light during turning-on of the lamp or a distribution of incident light during turning-off of the lamp, the width of a document is detected and the length in the longitudinal direction of a document is detected. The influence of the ambient light is removed by subtracting the distribution of incident light during turning-off of the lamp from the distribution of reflection light during turning-on of the lamp.

In particular, in this embodiment, since the threshold for determining an ambient light brightness variation is changed in accordance with the angle region of the platen cover 22, the easiness of detection of the ambient light can be switched, for each angle region of the platen cover 22, in accordance with the susceptibility to the ambient light. In the size detection in the large angle region less susceptible to a change in the ambient light brightness, even when the variation in the ambient light is large, the influence thereof can be underestimated and the ambient light automatic size detection result can be actively applied, and thus appropriate determination of the ambient light brightness variation can be performed without reducing the usability.

In the read operation using, as a trigger, the fact that the open state of the pressure plate has transitioned to the middle angle region from the large angle region, reading needs to be finished within a short period of time until the pressure plate is closed, and therefore the read operation trends to be susceptible to a change in brightness of the ambient light. In this embodiment, the threshold for determining an ambient light brightness variation is changed in accordance with the angle region of the pressure plate when reading is started. That is, the threshold is changed in accordance with the susceptibility to the ambient light for each angle region of the pressure plate so as to switch the easiness of detection of the ambient light. Therefore, even when the variation in the ambient light is large in size detection in the large angle region less susceptible to a change in the ambient light brightness, the influence thereof can be underestimated and the ambient light automatic size detection result can be actively applied. Therefore, appropriate determination of the ambient light brightness variation can be performed without reducing the usability.

Furthermore, in this embodiment, a distribution of the reflection light or incident light during turning-on and turning-off of the exposure lamp 94 which emits light toward a document is recorded, and on the basis of a difference extracted from the distributions of reflection light during turning on and turning off of the exposure lamp 94, the width of a document is detected and the length in the longitudinal direction of a document is detected. By subtracting the ambient light from the reflection light on the basis of a difference extracted from the distributions of reflection light during turning on and turning off of the exposure lamp 94, the influence of the ambient light without a temporal variation (of the stationary ambient light) can be removed.

Note that, the preset invention is not limited to the above-described embodiment as it is, and in its implementation stage, the above-described embodiment can be realized by modifying the components without departing from the scope of the present invention. Moreover, various inventions can be made by suitably combining a plurality components disclosed in the above described embodiment. For example, several components may be removed from all the components illustrated in the embodiment.

Moreover, for example, each of the described functions and processing may be implemented by one or more processing circuits. The processing circuit includes a programmed processor, an electric circuit, etc., and further includes a device, such as an application specific integrated circuit (ASIC), and a circuit component or the like arranged so as to perform the described function.

The present application is based upon and claims the benefit of priority from Japanese Patent Application No. 2015-151647, filed on Jul. 31, 2015, the entire content of which are incorporated herein by reference.

INDUSTRIAL APPLICABILITY

According to the present invention, by calculating the variation amount for a fixed period of time of the incident light, the change in brightness of the ambient light which leads to erroneous detection of the document size can be detected. When the ambient light is varying, by switching the approaches of setting the document size the erroneous detection of the document size can be reduced while maintaining the advantage of the automatic size detection.

The invention claimed is:
1. An image reading device which optically reads a document, comprising:
 a platen on which a document is placed;
 a pressure plate openable and closable with respect to the platen;

an angle detector which detects a fact that an open/close angle of the pressure plate has passed a predetermined angle from a close state;
a reader which records a variation in a distribution for a fixed period of time of incident light heading toward the platen when the angle detector detects passing of the pressure plate;
a variation amount calculator which calculates a variation amount of incident light at each distribution point on a basis of a variation in distribution recorded by the reader; and
a variation amount determiner which determines whether or not a variation amount calculated by the variation amount calculator exceeds a predetermined threshold.

2. The image reading device according to claim 1, further comprising:
a lighting window which is spaced from the platen, said lighting window being configured to receive incident light; and
a mover configured to move the reader between a lower position of the platen and a lower position of the lighting window, wherein the reader records a variation in distribution of incident light through the lighting window.

3. The image reading device according to claim 2, further comprising:
a threshold changer configured to change the threshold in accordance with a detection result of the angle detector when reading is started.

4. The image reading device according to claim 1, further comprising:
a threshold changer configured to change the threshold in accordance with a detection result of the angle detector when reading is started.

* * * * *